US012584351B2

(12) United States Patent
Austin et al.

(10) Patent No.: US 12,584,351 B2
(45) Date of Patent: Mar. 24, 2026

(54) SCREEN CHANNEL INSERTS FOR FENESTRATION UNITS

(71) Applicant: Pella Corporation, Pella, IA (US)

(72) Inventors: Adam Austin, Altoona, IA (US); Travis Eisenbarth, Otley, IA (US)

(73) Assignee: Pella Corporation, Pella, IA (US)

( * ) Notice: Subject to any disclaimer, the term of this patent is extended or adjusted under 35 U.S.C. 154(b) by 299 days.

(21) Appl. No.: 17/985,516

(22) Filed: Nov. 11, 2022

(65) Prior Publication Data

US 2023/0151688 A1 May 18, 2023

Related U.S. Application Data

(60) Provisional application No. 63/264,003, filed on Nov. 12, 2021.

(51) Int. Cl.
*E06B 9/52* (2006.01)

(52) U.S. Cl.
CPC .......... *E06B 9/52* (2013.01); *E06B 2009/527* (2013.01)

(58) Field of Classification Search
CPC ........ E06B 9/52; E06B 2009/527; E06B 3/30; B60J 1/2011; B60J 1/2094
See application file for complete search history.

(56) References Cited

U.S. PATENT DOCUMENTS

| | | | | |
|---|---|---|---|---|
| 2,989,788 A * | 6/1961 | Kessler | E06B 9/52 160/381 |
| 3,220,469 A * | 11/1965 | Oehmig | E06B 9/52 160/395 |
| 3,442,059 A * | 5/1969 | Kessler | E06B 3/62 52/656.5 |
| 4,015,394 A * | 4/1977 | Kessler | E06B 3/6715 52/786.13 |
| 4,114,331 A * | 9/1978 | Yamamoto | E06B 3/4654 49/404 |
| RE32,509 E * | 9/1987 | Werner | E06B 3/28 52/204.597 |
| 4,899,797 A * | 2/1990 | Green | F16B 5/0692 160/395 |
| 5,301,737 A * | 4/1994 | Martin | E06B 9/52 160/395 |
| 6,125,910 A * | 10/2000 | Pepperell | E06B 9/01 160/381 |
| 7,302,986 B2 | 12/2007 | Flack | |
| 8,484,926 B1 | 7/2013 | Caruso | |
| 9,453,369 B1 * | 9/2016 | Green | E06B 9/52 |

(Continued)

FOREIGN PATENT DOCUMENTS

| | | | | |
|---|---|---|---|---|
| WO | WO-9713950 A1 * | 4/1997 | | E06B 9/52 |
| WO | 2000073614 A1 | 12/2000 | | |
| WO | 2018/032054 A1 | 2/2018 | | |

*Primary Examiner* — Beth A Stephan

(57) ABSTRACT

A screen channel insert for use in connection with a fenestration unit frame including a spline channel. The screen channel insert includes a frame attachment portion for attaching the screen channel insert to the spline channel of the fenestration unit frame, and a channel portion defining an insert spline channel. The insert spline channel is configured to receive a spline to secure a screen to the screen channel insert. The insert spline channel can have different sizes than the spline channel of the frame, enabling the frame to be used with screens having different thicknesses.

18 Claims, 3 Drawing Sheets

(56) References Cited

U.S. PATENT DOCUMENTS

| | | | | |
|---|---|---|---|---|
| 9,617,784 | B2 | 4/2017 | Houlihan | |
| 10,612,294 | B2 | 4/2020 | Brown | |
| 10,689,858 | B2 * | 6/2020 | Scherrer | E04B 9/0414 |
| 11,149,491 | B1 * | 10/2021 | Ulsh | E06B 3/96 |
| 2008/0149282 | A1 | 6/2008 | Therrien | |
| 2014/0041324 | A1 * | 2/2014 | Massey | E06B 5/10<br>52/203 |
| 2014/0130993 | A1 | 5/2014 | Zwar | |
| 2015/0233177 | A1 | 8/2015 | Marchand | |
| 2015/0284994 | A1 | 10/2015 | Richter | |
| 2016/0298387 | A1 * | 10/2016 | Green | E06B 3/721 |
| 2021/0102427 | A1 * | 4/2021 | Karolevitz | B41J 29/17 |

* cited by examiner

SCREEN CHANNEL INSERTS FOR FENESTRATION UNITS

CROSS REFERENCE TO RELATED APPLICATION

The present application claims the benefit of U.S. Provisional Patent Application No. 63/264,003 filed Nov. 12, 2021, which is incorporated herein by reference in its entirety.

TECHNICAL FIELD

Various aspects of this disclosure relate to fenestration products, such as windows and doors. In some specific examples, the disclosure relates to structures for securing barriers or panels, such as screens, to a frame.

BACKGROUND

Fenestration units such as windows and doors may include a frame that supports a barrier or panel such as a glass pane or a screen. Some panels, such as screens and pet cloths, may be formed from flexible materials, and may be attached to the frame by a spline that secures the panel within a channel on the frame.

There remains a need for improved fenestration units. In particular, there is a need for improved structures for attaching panels such as screens to the fenestration unit frame. Such structures that efficiently enhance the functionality of the frame would be particularly advantageous.

SUMMARY

Various aspects of the disclosure relate to a panel channel insert, such as a screen channel insert, that can be used in combination with a fenestration unit frame having a spline channel. An exemplary panel channel insert comprises a frame attachment portion and a channel portion. The frame attachment portion is configured to attach the panel channel insert to the spline channel of the fenestration unit frame. The channel portion defines an insert spline channel configured to receive a spline to secure the panel to the panel channel insert. For example, the insert spline channel can have different sizes than the spline channel of the fenestration unit frame, enabling the frame to be used with screens or other panels having different thicknesses.

In some examples, the frame attachment portion includes a first wall section and an arm with a head spaced from the first wall section. The insert spline channel may be defined at least in part by the first wall section, and a second wall section spaced apart from and opposite the first wall section from the arm. In some examples the frame attachment portion may define a snap. For example, the first wall section and the arm may be resiliently moveable with respect to one another.

In some examples, the channel portion defines an insert spline channel having a cross sectional area that is different, and optionally larger, than a cross sectional area of the spline channel of the frame.

In some examples, the spline channel of the frame is configured to receive a spline having a first cross sectional area. The panel channel insert may be used with a panel, optionally a screen, including a portion within the spline channel of the panel channel insert. A spline having the first cross sectional area may be positioned within the spline channel to attach the panel to the panel channel insert.

Some examples further include the frame, wherein the panel channel insert is attached to the frame.

In some examples, the frame attachment portion is configured to attach the panel channel insert to a spline channel of a frame configured to receive a panel having a first thickness, and the channel portion of the panel channel insert defines an insert spline channel configured to receive a spline to secure a panel having a second thickness different than the first thickness, and optionally greater than the first thickness, to the panel channel insert. In some embodiments, the frame attachment portion is configured to attach the panel channel insert to a spline channel of a frame configured to receive the panel having the first thickness using a spline having a first size and shape configuration and the channel portion of the panel channel insert is configured to secure the panel having the second thickness to the panel channel insert using a spline having the first size and shape configuration.

In some examples, the frame attachment portion is configured to attach the panel channel insert to a spline channel of a frame having a first size and shape configuration, and the channel portion of the panel channel insert defines an insert spline channel having a second size and shape configuration that is different, and optionally larger, than the first size and shape configuration. In some embodiments, the frame attachment portion is configured to attach the panel channel insert to a spline channel frame configured for use with a spline having a first shape and size configuration, and the channel portion is configured to secure the panel to the channel panel insert using a spline having the first shape and size configuration.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive.

Figure 1:
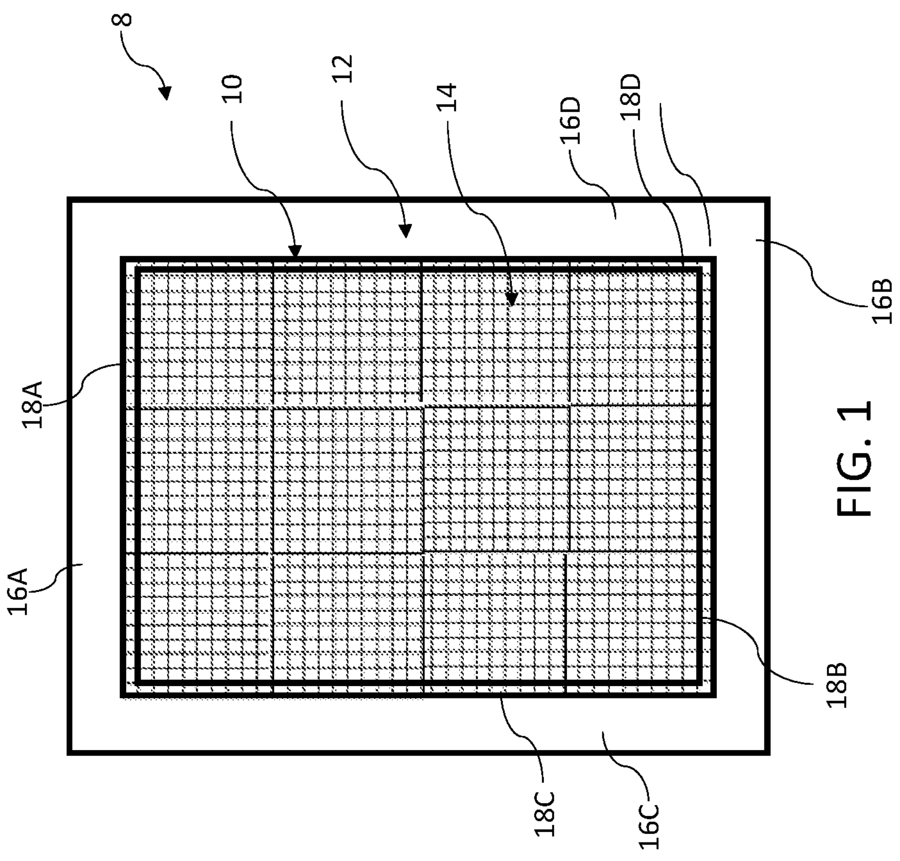
FIG. 1 is an illustration of an exemplary fenestration unit including a screen channel insert, in accordance with some examples.

While the disclosure is amenable to various modifications and alternative forms, specific embodiments have been shown by way of example in the drawings and are described in detail below. The disclosure, however, is not limited to the particular embodiments described. On the contrary, the disclosure is intended to cover all modifications, equivalents, and alternatives falling within the scope of the disclosure as defined by the appended claims.

DETAILED DESCRIPTION

Screen channel inserts according to the inventive examples may be adapted for fenestration units including a variety of window and/or door styles (collectively referred to as "fenestration units") including sliding, hinged, fixed, casement, awning, projected, and others. The screen channel insert enables screens of different thicknesses to be attached or mounted to the fenestration unit. For example, the screen channel insert may enable a screen that is thicker than a screen that the fenestration unit was configured to support to be attached to the fenestration unit. The screen channel insert enables screens to be securely mounted to the fenestration unit. The screen channel insert thereby enables the fenestration unit to be efficiently and effectively adapted for use with screens having a range of different thicknesses. Although described as a screen channel insert for mounting a screen to the fenestration unit, channel inserts according to the inventive examples may be adapted and used to mount other barriers or panels, including transparent, semi-transparent, opaque or other non-mesh materials to the fenestration unit.

FIG. 1 is an illustration of a fenestration unit 8 including a screen channel insert 10, frame 12 and screen 14 in accordance with some examples. In the illustrated examples, frame 12 is formed from top, bottom, first side and second side frame members 16A-16D, respectively, which are generally elongated members and which may have a generally constant cross-sectional shape along their lengths. Frame members 16A-16D may be joined by conventional or otherwise known structures and/or approaches, such as cornerlocks, to form the frame 12. In embodiments, frame members 16A-16D may be polymer members formed by extrusion processes. In other embodiments the frame members 16A-16D may be formed from other suitable materials using other conventional or otherwise known methods.

Similarly, the illustrated examples of screen channel insert 10 are formed from top, bottom, first side and second side channel insert members 18A-18D, respectively, which may have a generally constant cross-sectional shape along their lengths. As described in greater detail below, the channel insert members 18A-18D are configured to be attached to the associated frame members 16A-16D, respectively. The channel insert members 18A-18D may also be joined to one another in embodiments. In embodiments, channel insert members 18A-18D may be polymer members formed by extrusion processes. In other embodiments the channel insert members 18A-18D may be formed from other suitable materials using other conventional or otherwise known methods. As described in greater detail below, screen 14 is attached to the channel insert members 18A-18D by a spline.

Figure 2:
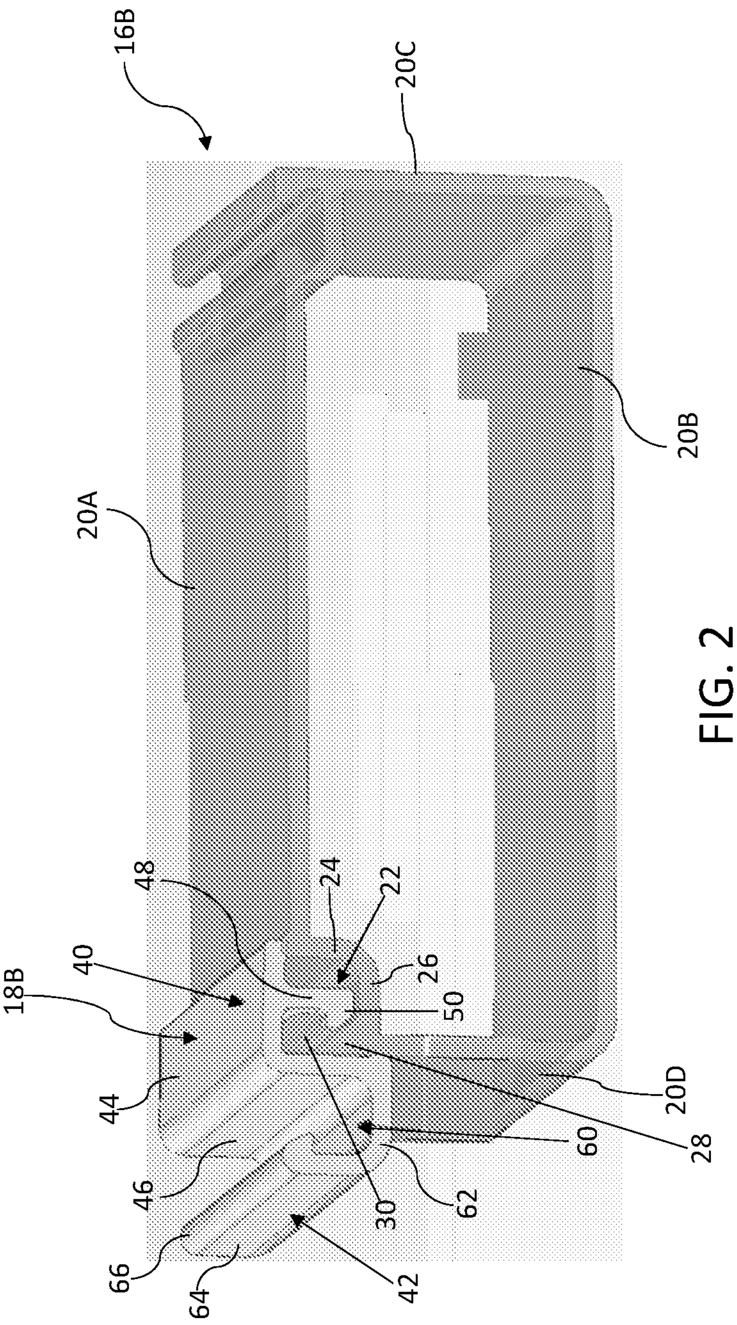
FIG. 2 is a detailed illustration of cross sectional portions of a fenestration frame member and a channel insert member, in accordance with some examples.

FIG. 2 illustrates portions of lengths of a frame member 16B and a channel insert member 18B in accordance with examples. The other frame members 16A, 16C, 16D and channel insert members 18A, 18C, 18D may be substantially the same as or similar to the illustrated frame member 16B and channel insert member 18B. Frame member 16B, which can be of a conventional or otherwise known structure, is a hollow member defined by four walls 20A-20D. An elongated screen channel 22 (i.e., a frame screen channel) extends along the length of the frame member 16B, and is located on the wall 20A, adjacent to the wall 20D, in the illustrated examples. In the illustrated examples, the screen channel 22 is generally L-shaped in cross section, and is defined by a wall section 24 that extends toward an interior of the frame member 16B from the wall 20A, a wall section 26 that extends between the wall section 24 and the wall 20D, and a wall section 28. The wall section 28 is generally opposite the screen channel 22 from wall section 24, extends from the wall section 26, and is an end portion of the wall 20D in the illustrated embodiments. The end of wall section 28 adjacent the open side of the screen channel 22 includes an enlarged portion such as head 30 that defines a lip extending into the screen channel. The cross sectional shape of screen channel 22 on the frame member 16B may take a conventional or otherwise known configuration. The screen channel 22 may be sized with dimensions that enable an elongated spline (not shown in FIG. 2) of a predetermined size to be inserted into and retained within the screen channel, with the screen (not shown in FIG. 2) having a predetermined thickness wrapped around the spline to securely mount the screen to the frame member 16B.

Screen channel insert member 18B includes a frame attachment portion 40 and a screen channel portion 42. Frame attachment portion 40, which may be a channel attachment structure in embodiments, is configured to securely attach to the frame member 16B by engagement with the screen channel 22, and in the illustrated examples includes a wall section 44 that extends over the open side of the screen channel, a wall section 46 that engages the wall section 28 of the screen channel, and an arm 48 extending from the wall section 44 into the screen channel. An end of the arm 48 opposite the wall section 44 includes an enlarged portion such as a head 50 that defines a lip. In the illustrated examples the wall section 46 of the frame attachment portion 40 engages the outer surface of the wall section 28 of the screen channel 22, with the head 50 of the channel insert member 18B and the head 30 of the screen channel engaging in overlapping relationship to secure the channel insert member 18B to the screen channel 22 of the frame member 16B. In embodiments, one or both of the frame attachment portion 40 of the channel insert member 18B and the wall section 28 of the screen channel 22 may have sufficient resilience to enable the channel insert member 18B to snap onto the frame member 16B at the channel 22. Alternatively or in other embodiments, the frame attachment portion 40 of the channel insert member 18B and the wall section 28 of the screen channel 22 are rigid, and the screen channel insert member 18B may be slid into mating engagement with the screen channel 22 (e.g., about the longitudinal axes of the channel insert member and screen channel after engaging their ends). In yet other embodiments (not shown), the frame attachment portion 40 takes other structural configurations, or is configured for attachment to the screen channel 22 of the frame member 16B by other approaches.

Screen channel portion 42 of the channel insert member 18B defines an elongated spline channel 60 that extends along the length of the channel insert member adjacent and generally parallel to the frame attachment portion 40. As shown, the spline channel 60 opens in the same direction that the screen channel 22 of the frame member 16B opens when the channel insert member 18B is attached to the frame member. In the illustrated examples the spline channel 60 is generally L-shaped in cross section, and is defined by the wall section 46 of the frame attachment portion 40, a wall section 62 that extends from the wall section 46 opposite the frame attachment portion, and a wall section 64. The wall section 64 is generally opposite the spline channel 60 from the wall section 46 and extends from the wall section 62. An end of the wall section 64 adjacent to the open side of the spline channel 60 includes an enlarged portion such as a head 66 that defines a lip extending into the spline channel. In the illustrated embodiment, the spline channel 60 has a cross-sectional shape that is similar to or substantially the same as the cross-sectional shape of the screen channel 22 of the frame member 16B. In other embodiments (not shown), the cross-sectional shape of the spline channel 60 may be different than that of the screen channel 22.

Figure 3:
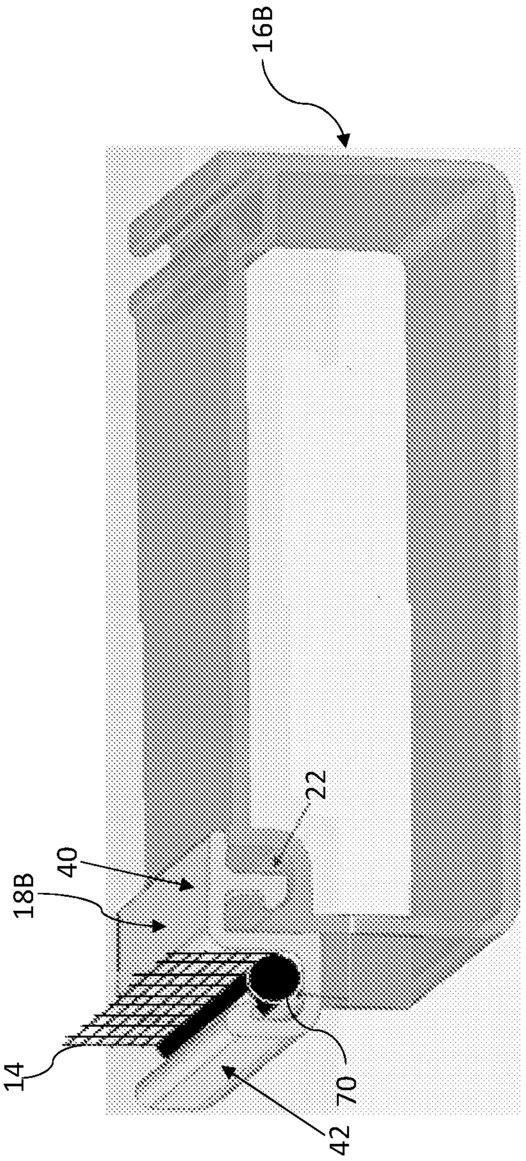
FIG. 3 is a detailed illustration of the frame member and channel insert member shown in FIG. 2, with a screen attached to the channel insert member by a spline.

FIG. 3 shows the screen 14 attached to the channel insert member 18B. As shown, the screen 14 wraps around an elongated spline 70 that is inserted into and secured within the spline channel 60 (e.g., at least partially by engagement with the head 66. Conventional or otherwise known spline attachment methods and structures can be used to attach the screen 14 to the channel insert member 18B.

Channel insert member 18B enable the frame member 16B to be used in connection with screens 14 having thickness that differ from the thickness of screens for which the screen channel 22 of the frame member may have been configured. In the illustrated embodiments, for example, the spline channel 60 of the channel insert member 18B is larger in size (e.g., in cross sectional area) than the size of the screen channel 22 of the frame member 16B. A screen 14 having a thickness greater than the thickness of the screen that the frame member 16B was configured to receive can thereby be mounted to the frame member. In embodiments, the spline 70 used to attach the screen 14 to the channel insert member 18B may have a size that is similar to or substantially the same as the size of the spline for which the screen channel 22 of the frame member 16B was configured. Therefore, different frame members 16B may not be needed to accommodate screens of different thicknesses (e.g., a given or common frame member can be adapted for use with screens having different thicknesses). In addition to providing the flexibility of enabling screens such as 14 of different thicknesses to be used with the frame member 16B, the same spline such as 70 used with the frame member may also be used with the screen channel insert member 18B. Efficiencies of manufacture and distribution, as well as functionality, may thereby be achieved. By way of example, channel insert member 18B may be configured to attach a relatively thicker and pet-resistant screen 14 or a relatively thicker sun blocking screen to the frame 12, where the frame 12 was configured for a relatively thinner insect barrier screen.

Various modifications and additions can be made to the exemplary embodiments described herein without departing from the spirit and scope of this disclosure. For example, while the embodiments described above refer to particular features, the scope of this disclosure also includes embodiments having different combinations of features and embodiments that do not include all of the described features. Accordingly, the scope of this disclosure is intended to embrace all such alternatives, modifications, and variations as fall within the scope of the claims, together with all equivalents thereof.

What is claimed is:

1. A panel channel insert for a fenestration unit including a frame defining an interior portion configured to receive a panel, comprising:
- a frame attachment portion configured to attach the panel channel insert to a spline channel of the frame, wherein the spline channel of the frame comprises an opening in a top surface of the frame and is spaced from the interior portion, and wherein the spline channel extends in a first direction; and
- a channel portion adjacent to and extending from the frame attachment portion, the channel portion defining an insert spline channel located in the interior portion of the frame and along a side edge of the frame when the frame attachment portion attaches the panel channel insert to the spline channel of the frame, wherein the insert spline channel has an open side configured to receive a spline to secure the panel to the panel channel insert, wherein the insert spline channel extends in the first direction and is spaced from the spline channel of the frame when the frame attachment portion attaches the panel channel insert to the spline channel of the frame.

2. The panel channel insert of claim 1 wherein the frame attachment portion includes a channel attachment structure to snap into the spline channel of the frame.

3. The panel channel insert of claim 2 wherein the channel attachment structure includes:
- a first wall section; and
- an arm including a head, wherein the arm is spaced apart from the first wall section.

4. The panel channel insert of claim 3 wherein the insert spline channel is located opposite the first wall section from the arm.

5. The panel channel insert of claim 4 wherein the insert spline channel is defined at least in part by the first wall section and a second wall section spaced apart from and opposite the first wall section from the arm.

6. The panel channel insert of claim 5 wherein the insert spline channel includes a cross sectional area that is different, and optionally larger, than a cross sectional area of the spline channel of the frame.

7. The panel channel insert of claim 6 wherein the spline channel of the frame is configured to receive a spline having a first cross sectional area, further including:
- a panel, optionally a screen, including a portion within the insert spline channel of the panel channel insert; and
- a spline having the first cross sectional area within the insert spline channel to attach the panel to the panel channel insert.

8. The panel channel insert of claim 7, further including the frame, and wherein the panel channel insert is attached to the frame.

9. The panel channel insert of claim 1 wherein:
- the frame attachment portion includes:
  - a first wall section; and
  - an arm with a head spaced from the first wall section; and
- the insert spline channel is defined at least in part by the first wall section, and a second wall section spaced apart from and opposite the first wall section from the arm.

10. The panel channel insert of claim 9 wherein the insert spline channel includes a cross sectional area that is larger than a cross sectional area of the spline channel of the frame.

11. The panel channel insert of claim 10 wherein the spline channel of the frame is configured to receive a spline having a first cross sectional area, further including:
- a panel, optionally a screen, including a portion within the insert spline channel of the panel channel insert; and
- a spline having the first cross sectional area within the insert spline channel to secure the panel to the panel channel insert.

12. The panel channel insert of claim 11, further including the frame, and wherein the panel channel insert is attached to the frame.

13. The panel channel insert of claim 1, wherein:
- the frame attachment portion is configured to attach the panel channel insert to a spline channel configured to receive a panel having a first thickness; and
- the insert spline channel is configured to receive a spline to secure a panel having a second thickness different than the first thickness, and optionally greater than the first thickness, to the panel channel insert.

14. The panel channel insert of claim 13, wherein:
- the frame attachment portion is configured to attach the panel channel insert to a spline channel configured to receive the panel using a spline having a first size and shape configuration; and the panel channel insert is configured to secure the panel to the panel channel insert using a spline having the first size and shape configuration.

15. The panel channel insert of claim 1 wherein:

the frame attachment portion is configured to attach the panel channel insert to a spline channel having a first size and shape configuration; and the insert spline channel includes a second size and shape configuration that is different, and optionally larger, than the first size and shape configuration.

16. The panel channel insert of claim 15 wherein:

the frame attachment portion is configured to attach the panel channel insert to a spline channel configured for use with a spline having a first shape and size configuration; and the channel portion is configured to secure the panel to the panel channel insert using a spline having the first shape and size configuration.

17. The panel channel insert of claim 1, wherein the first direction is perpendicular to a plane defined by the fenestration unit.

18. The panel channel insert of claim 1, wherein the frame attachment portion and the insert spline channel are parallel.

* * * * *